UNITED STATES PATENT OFFICE.

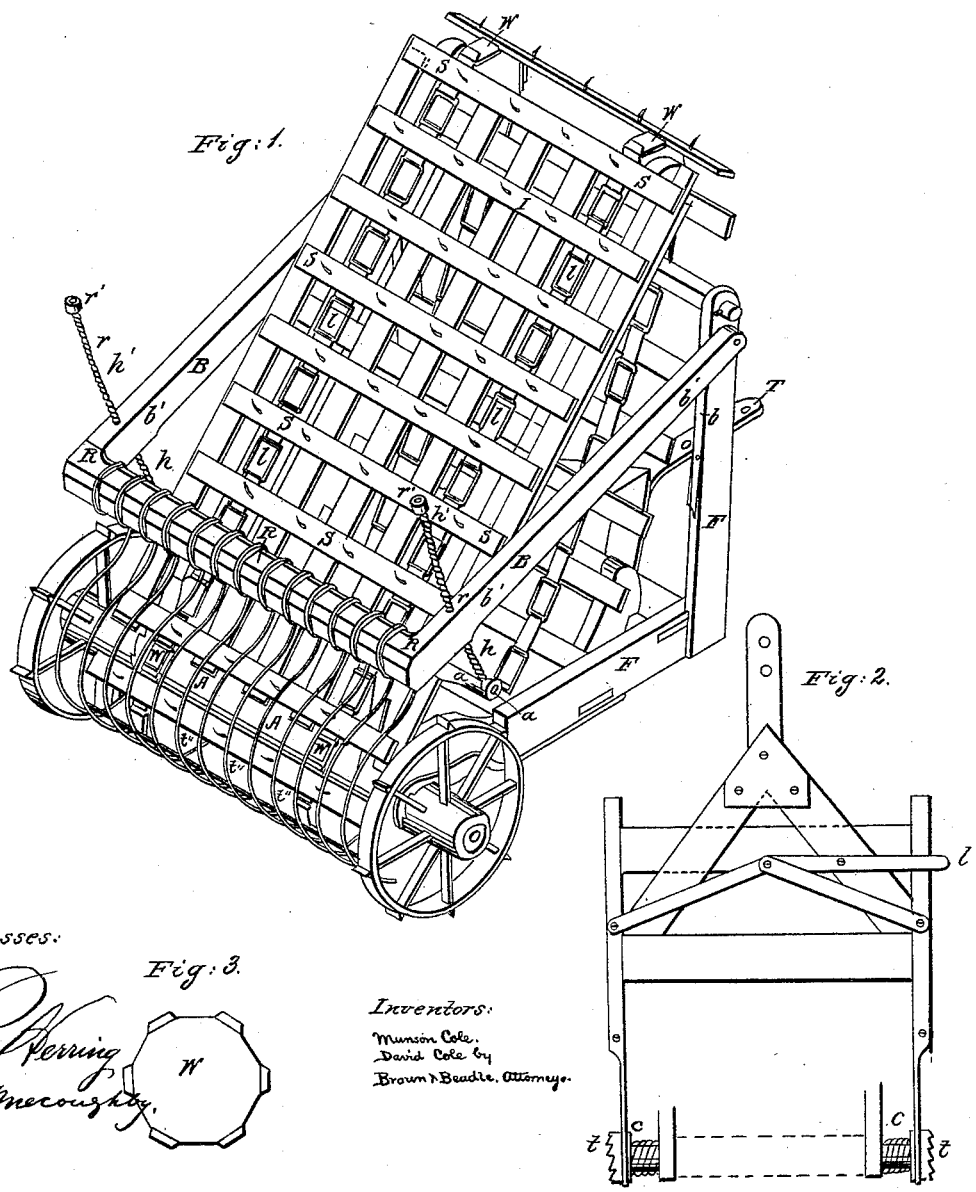

MUNSON COLE, OF TORRINGTON, AND DAVID COLE, OF KENT, CONN.

IMPROVEMENT IN MACHINES FOR RAKING AND LOADING HAY.

Specification forming part of Letters Patent No. 58,601, dated October 9, 1866.

*To all whom it may concern:*

Be it known that we, MUNSON COLE, of Torrington, and DAVID COLE, of Kent, in the county of Litchfield and State of Connecticut, have invented a new and Improved Machine for Raking and Loading Hay; and we do hereby declare that the following is a full, clear, and exact description of the construction and operation of the same, reference being had to the annexed drawings, making a part of this specification, in which—

Figure 1 is a perspective view; Fig. 2, a top view of the tongue, lever, and clutch; and Fig. 3, a side elevation of one of the wheels operating the belt.

This invention consists of a hay-rake resting upon springs, and capable of being elevated and depressed when necessary, in combination with revolving belts, for the purpose of raking hay and loading it, as will be hereinafter fully described.

In Fig. 1, F represents the frame, the upper surface of which is an inclined plane, at an angle of about forty-five degrees, the lower end of which is formed by the axle A, which is provided near each end with a wheel, $w$, Fig. 3, fastened securely to it. At the upper end of the frame a shaft similarly provided with wheels is placed. These wheels are so constructed that the projections of their surfaces exactly fit into the links $l$ of the endless belts $b$, between which links are fastened slats $s$, provided at regular distances with fork-tines.

The axle at either end, next the supporting-wheel, is provided with a clutch arrangement, $c$, moving freely upon it sidewise, but not revolving upon it, connected with the lever $l'$, by means of which, at the will of the operator, the teeth $t$ of the clutch $c$ are forced into contact with the corresponding teeth $t'$ upon the wheel, and the axle, as the machine moves forward, is forced to revolve with the wheel. This communicates motion to the belt by means of the wheels, Fig. 3, attached to the main axle.

When it is desired to move the machine without operating the elevator, by a movement of the lever $l$ the clutch is disconnected from the wheel, and the axle remains stationary while the wheels revolve.

R represents the rake, constructed like an ordinary horse-rake, provided with bars $b'$, and kept in position by the rods $r$. The bars $b'$ rest upon spiral springs $h$, inclosing the rods $r$, which serve to keep the teeth resting upon the surface of the ground when passing over uneven ground, for if the wheels are raised, the spring, yielding, allows the teeth to fall.

A similar spring, $h'$, incloses the rods $r$ upon the upper side of the bar $b'$ and presses up against the rod-head $r'$. This spring is intended to give way in case the teeth of the rake come in contact with any obstruction, and, by yielding, allow the teeth to rise and pass without injury. The lower end of the rod $r$ passes around the end of the small projection $a$, provided for that purpose, and forms an eye. The bar $b'$, extending forward to the frame F, acts as a lever, and is kept in position ordinarily by the button $b''$.

When it is desired to elevate the rake-teeth, the button $b''$ is forced back, the forward end of the bar $b'$ depressed, and the rod $r$ freely moving upon its axis $a$, the object desired is accomplished. It can be kept in this position by allowing the lower end of the button $b''$ to press against it.

From this description the operation of the machine is readily apparent. The machine being attached to the rear end of a hay-wagon, and motion communicated, the rake, gathering the hay from the ground, gives it up to the fork-tines upon the revolving belts, and these, carrying it over the point of the inclined plane, loose it by the attraction of gravitation, and it falls into the hay-wagon below. When desiring to move without operating the machine, the lever $l'$ is thrown back and the bar $b'$ depressed, thus disconnecting the clutch and elevating the rake.

We do not claim, broadly, the idea of the revolving belts or the gathering-rake; but What we do claim, and desire to secure by Letters Patent, is—

1. The gathering-rake arranged, in combination with the rods $r$, springs $h$, and bar $b'$, substantially as described.

2. In combination with the above, the endless elevator and clutch arrangement, all arranged and operating substantially as and for the purposes set forth.

MUNSON COLE.
DAVID COLE.

Witnesses:
E. S. WOODFORD,
L. BALDWIN.